(12) United States Patent
BenHanokh et al.

(10) Patent No.: US 11,789,908 B2
(45) Date of Patent: Oct. 17, 2023

(54) OFFLOADING MEMORY MAINTENANCE FOR A LOG-STRUCTURED FILE SYSTEM

(71) Applicant: RED HAT, INC., Raleigh, NC (US)

(72) Inventors: Gabriel Zvi BenHanokh, Tel-Aviv (IL); Joshua Durgin, Canyon Country, CA (US)

(73) Assignee: RED HAT, INC., Raleigh, NC (US)

( * ) Notice: Subject to any disclaimer, the term of this patent is extended or adjusted under 35 U.S.C. 154(b) by 423 days.

(21) Appl. No.: 17/095,293

(22) Filed: Nov. 11, 2020

(65) Prior Publication Data
US 2022/0147446 A1    May 12, 2022

(51) Int. Cl.
*G06F 16/18*    (2019.01)
*G06F 16/11*    (2019.01)
*G06F 16/17*    (2019.01)
*G06F 12/02*    (2006.01)

(52) U.S. Cl.
CPC ...... *G06F 16/1805* (2019.01); *G06F 12/0253* (2013.01); *G06F 16/116* (2019.01); *G06F 16/1727* (2019.01); *G06F 16/18* (2019.01); *G06F 16/1815* (2019.01); *G06F 2212/7205* (2013.01)

(58) Field of Classification Search
CPC .. G06F 16/18; G06F 16/1805; G06F 16/1815; G06F 16/116; G06F 16/1727
USPC ........................................................ 707/813
See application file for complete search history.

(56) References Cited

U.S. PATENT DOCUMENTS

| | | | |
|---|---|---|---|
| 9,460,008 B1* | 10/2016 | Leshinsky | G06F 16/1805 |
| 9,710,317 B2 | 7/2017 | Gupta et al. | |
| 9,842,026 B2 | 12/2017 | Eslami Sarab | |
| 2013/0326117 A1* | 12/2013 | Aune | G06F 3/064 |
| | | | 711/103 |
| 2017/0024315 A1* | 1/2017 | Leshinsky | G06F 16/1805 |
| 2017/0604448 | 3/2017 | Schnarch et al. | |

OTHER PUBLICATIONS

Dubeyko, V., "SSDFS: Towards LFS Flash-Friendly File System without GC operations," Jul. 27, 2019, https://arxiv.org/pdf/1907.11825.pdf.
Choi, G., et al., "A New LSM-Style Garbage Collection Scheme for ZNS SSDs," Dankook University: SK Hynix, 2020, https://www.usenix.org/system/files/hotstorage20_paper_choi_0.pdf.
Kim, J., et al., "Alleviating Garbage Collection Interference Through Spatial Separation in All Flash Arrays," Virginia Tech; Cornell University; DGIST; UNIST, Jul. 10-12, 2019, https://www.usenix.org/system/files/atc19-kim-jaeho.pdf.

(Continued)

*Primary Examiner* — Shahid A Alam
(74) *Attorney, Agent, or Firm* — Kilpatrick Townsend & Stockton LLP

(57) ABSTRACT

Garbage collection for a log-structured file system can be offloaded from a processor to an internal controller of a storage device, such as a solid-state drive. For example, an internal controller of a storage device can determine characteristics of a log-structured file system hosted by a processor that is external to the storage device. The characteristics can indicate how data is arranged in the log-structured file system. The internal controller can then execute, based on the characteristics, a garbage collection process with respect to the data of the log-structured file system on behalf of the processor.

20 Claims, 3 Drawing Sheets

(56) References Cited

OTHER PUBLICATIONS

Aurora, V., "Log-Structured File Systems: There's One in Every SSD," Eklektix, Inc., Sep. 18, 2009, https://lwn.net/Articles/353411/.
Nagel, L., et al., "Time-efficient Garbage Collection in SSDs," Loughborough University; Johannes Gutenberg University Mainz, Germany, Jul. 24, 2018, https://arxiv.org/pdf/1807.09313.pdf.
Hutchinson, L., "Ask Ars: My SSD does garbage collection, so I don't need TRIM . . . right?," ars Technica, 2015, https://arstechnica.com/gadgets/2015/04/ask-ars-my-ssd-does-garbage-collection-so-i-dont-need-trim-right/.

* cited by examiner

OFFLOADING MEMORY MAINTENANCE FOR A LOG-STRUCTURED FILE SYSTEM

TECHNICAL FIELD

The present disclosure relates generally to storage systems. More specifically, but not by way of limitation, this disclosure relates to offloading memory maintenance for a log-structured file system from a processor to an internal controller of a storage device.

BACKGROUND

A log-structured file system is a type of file system that can be used to achieve better write performance, lower write amplification, and resiliency. To achieve better write performance, a log-structured filed system queues data writes in a log that is stored in memory. The log is a data structure that is written only at the head and serves as a buffer for the data writes. Once the log is full, the corresponding data blocks are written into an unused part of a storage device (e.g., a solid-state drive) in a sequential manner during a single write operation. This can reduce the total number of data writes to the storage device.

In some log-structured file systems, new data and metadata may accumulate in the log before ultimately being written at the same time to the storage device in a large contiguous chunk called a "segment," which can be several megabytes in size and span multiple data blocks. In other implementations, the new data and metadata may be written in segments relatively rapidly to the storage device, without first being buffered in the log. Either way, the metadata can include inodes and segment summaries. An inode contains a physical block pointer to a file. A segment summary maintains information about each data block in a segment, such as the inode number N of the inode that owns the data block and the offset F of the block inside the inode's data region. The format of the metadata can be specific to the particular log-structured file system being implemented.

Given the design of a log-structured file system, the contents of a single file can be distributed across the entire storage device. So, an inode map can be maintained at a known location to assist in locating a file's contents. The inode map can include a table indicating the location of each inode on the storage device. This table can be used to determine where a file's content resides on the storage device. The inode map can be consulted to determine where to retrieve a file's contents in response to a read request for the file.

DETAILED DESCRIPTION

Figure 1:
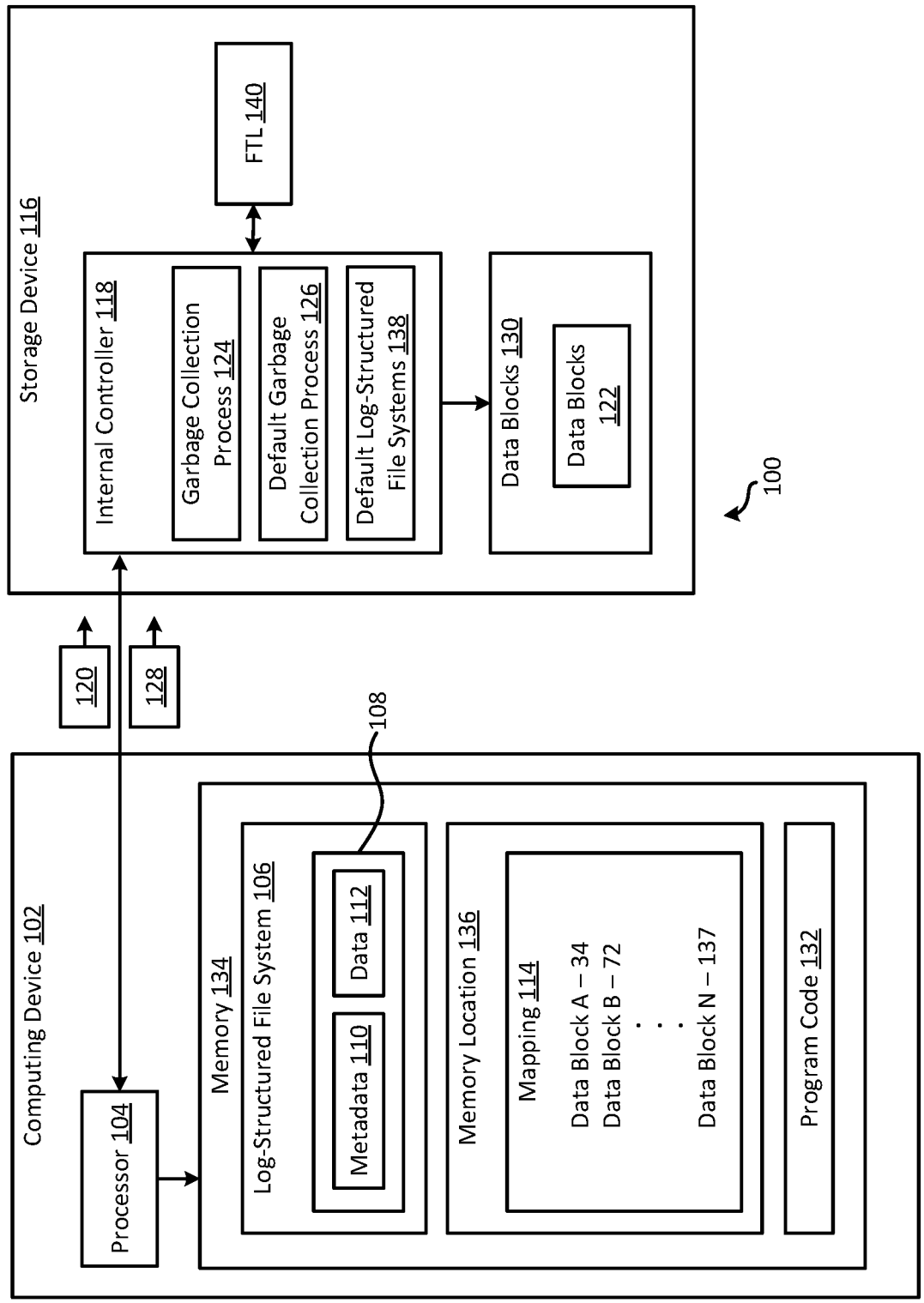
FIG. 1 is a block diagram of an example of a system for offloading garbage collection for a log-structured file system from a processor to an internal controller of a storage device according to some aspects of the present disclosure.

In a conventional arrangement, a central processing unit (CPU) of a computing device is generally responsible for maintaining a log-structured file system. For example, the CPU can receive write requests and optionally accumulate them in a log of the log-structured file system. The CPU can then sequentially write the corresponding data blocks to a storage device in a single write operation. The CPU is also generally responsible for performing memory maintenance operations associated with the log-structured file system. One example of such a memory maintenance operation is garbage collection. Garbage collection involves freeing space in the log to prevent the file system from becoming full. If the log is a circular log, the CPU can implement garbage collection to prevent the file system from becoming full when a head of the log wraps around to meet a tail of the log. For example, the CPU can start the garbage collection process towards the tail end of the log, releasing space and moving forward through the log by skipping over any data for which newer versions exist farther ahead in the log. If there are no newer versions of a piece of data farther ahead in the log, the piece of data can be moved and appended to the head of the log.

Using the CPU to manage garbage collection for the log-structured file system can be suboptimal. For example, the CPU can begin the garbage collection process by transmitting a read request to the storage device to retrieve data of the log-structured file system. In response to the read request, the storage device can transmit the requested data over a bus to a cache memory accessible to the CPU. The CPU can then analyze the data to identify stale (e.g., outdated or unused) data to be released. Analyzing the data may involve storing information in random access memory (RAM). After determining which data to release, the CPU can communicate that information to the storage device so that the storage device can reclaim the corresponding data blocks. As is apparent, the above process involves transmitting large amounts of data over the bus from the storage device to the cache memory, which can generate a significant amount of latency that reduces the performance of the log system. The above process also consumes valuable cache-memory space, RAM space, and processing power on performing garbage collection.

Some examples of the present disclosure can overcome one or more of the abovementioned problems by offloading garbage collection for a log-structured file system from a CPU to an internal controller of a storage device. The log-structured file system can still be generally maintained by the CPU, but the storage device can handle the garbage collection operations. More specifically, the CPU can transmit information about the log-structured file system to the internal controller of the storage device, so that the internal controller can determine which data blocks to reclaim during the garbage collection process. The internal controller can then execute the garbage collection process to reclaim the target data blocks. Using the internal controller to perform the garbage collection process can avoid the latency and bus traffic described above, since a large amount of data is no longer transmitted from the storage device to the cache memory. This approach can also free up the CPU, cache memory, and RAM for use in more important tasks, since these computing resources are no longer used to implement garbage collection.

As noted above, the CPU can transmit information about the log-structured file system to the internal controller of the storage device, so that the internal controller can execute the garbage collection process on behalf of the CPU. In some examples, the information can include a table indicating a latest sequence-number of each data block in the log-structured file system, so that the storage device can determine from the table which data blocks are stale. The CPU can generate and maintain such a table as part of the log-structured file system. Alternatively, the information can include a memory address of a memory location storing the table, so that the storage device can retrieve some or all of the table from the memory address and use the table to determine which data blocks are stale. In another example, the storage device can internally build this table based on sequence number information extracted from each CPU write request. For example, the storage device can extract sequence numbers from each write request issued by the CPU and generate such a table internally to keep track of each data block's latest sequence-number.

The CPU can additionally or alternatively transmit other information to the storage device to enable the storage device to execute the garbage collection process. For example, the CPU can transmit a metadata layout for the log-structured file system to the storage device. The metadata layout can be a description of the metadata format used by the CPU for the records of the long-structured file system. The metadata layout can indicate a starting offset/delimiter for the records; a description of the contents of a record such as the size of a record, the fields in a record, etc.; a starting offset/delimiter for the next record; or any combination of these. Based on the metadata layout, the storage device can extract and interpret the metadata in the CPU's log-structured file system (e.g., without further assistance from the CPU).

An internal controller of the storage device can receive some or all of the abovementioned information and determine characteristics of the log-structured file system based on the information. The internal controller can then execute the garbage collection process based on the characteristics. As one particular example, the storage device can be a solid-state drive with a flash translation layer (FTL). A FTL can map logical block addresses (LBAs) to the physical addresses of the flash memory in a logical-to-physical mapping. An internal controller of the solid-state drive can use the abovementioned information to determine which data blocks are stale. The internal controller can then free the stale data blocks by marking the stale data blocks as free in the FTL. With the stale data blocks are marked as free, they can be easily erased when new space is needed.

For clarity, it is noted that some storage devices have an internal, default log-structured file system for managing data blocks in the storage device. It will be appreciated that the CPU-controlled log-structured file system described above is different from such an internal, default log-structured file system controlled by the storage device. Likewise, some storage devices may periodically execute a default garbage collection process to internally manage the data blocks of the storage device. But such a default garbage collection process is different from the CPU-initiated garbage collection process described above, at least because the default garbage collection process is executed independently of the log-structured file system hosted by the CPU.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 according to some aspects of the present disclosure. The system 100 can include a computing device 102, such as a laptop computer, desktop computer, server, or mobile phone. The computing device 102 can include a processor 104, such as a central processing unit or another type of processor. The processor 104 can operate a log-structured file system 106. The log-structured file system 106 can include a log 108 for storing data 112 and corresponding metadata 110, such as inodes and segment summaries. The processor 104 may optionally accumulate the metadata 110 and the data 112 in the log 108 until the log 108 is full, at which point the processor 104 can transmit a write request 120 for sequentially writing the corresponding data blocks to a storage device 116, such as a sold-state drive or a hard drive. The storage device 116 can be located in any suitable location, such as internally or externally to a housing of the computing device 102, so long as the storage device 116 is communicatively coupled to the processor 104.

The processor 104 can also maintain a mapping 114 associated with the log-structured file system 106. The mapping 114 can indicate a latest-sequence number for each data block of the log-structured file system 106. In the example shown in FIG. 1, the mapping 114 indicates that the latest sequence-number for Data Block A is 34, the latest-sequence number for Data Block B is 72, and the latest-sequence number for Data Block N is 137. But this is merely exemplary and the mapping 114 can indicate the latest sequence-number for any number and combination of data blocks of the log-structured file system 106. The processor 104 may further maintain other data structures associated with the log-structured file system 106. For example, the processor can maintain an inode map indicating the location of each inode on the storage device 116.

In general, the processor 104 can be responsible for maintaining the log 108 and other data structures of the log-structured file system 106. The processor 104 can also control when and which data 112 is stored on the storage device 116 by transmitting write requests to the storage device 116. The processor 104 can coordinate with the storage device 116 to store the data 112 of the log-structured file system 106 on the storage device 116.

In a conventional arrangement, the processor 104 may execute a garbage collection process 124 associated with the log-structured file system 106. But in some examples of the present disclosure, the garbage collection process 124 can be offloaded to an internal controller 118 of the storage device 116, so that the internal controller 118 executes the garbage collection process 124. This can reduce latency in the system and free up the processor 104 for use in other tasks, among other benefits.

More specifically, the processor 104 can implement the garbage collection process 124 at least in part by transmitting information 128 describing aspects of the log-structured file system 106 to the internal controller 118 of the storage device 116. The internal controller 118 can receive the information 128 and determine characteristics of the log-structured file system 106 based on the information 128. The characteristics can indicate how data is arranged in the log-structured file system 106. Examples of such characteristics can include how inodes are arranged in the log-structured file system 106, how data blocks are arranged in the log-structured file system 106, sequence numbers corresponding to data blocks associated with the log-structured file system 106, characteristics of segments in the log-structured file system 106, a format of the metadata 110 of the log-structured file system 106, or any combination of these. The internal controller 118 can then execute the garbage collection process 124 based on one or more of the determined characteristics.

In some examples, the information 128 can include the mapping 114 of data blocks to sequence numbers. In other examples, the information 128 can indicate a memory location 136 at which the mapping 114 is stored. The memory location 136 can be within a memory 134 that is external to the storage device 116. The memory 134 can include one or more memory devices, such as a cache memory, a RAM, a hard drive, a sold-state drive, or any combination of these. At least some of the memory 134 can include a non-transitory computer-readable medium that includes program code 132 that is executable by the processor 104 for causing the processor to perform any of the functionality described herein. The internal controller 118 can receive the information 128, determine the memory address based on the information 128, and retrieve some or all of the mapping 114 from the memory location 136 associated with the memory address. The internal controller 118 may then store some or all of the mapping 114 in an internal cache memory or RAM of the storage device 116. In still other examples, the processor 104 can transmit write requests (e.g., write request 120) to the storage device 116 for implementing an aspect of the log-structured file system 106. The write requests can include sequence numbers associated with the data blocks to be written, where the sequence numbers can serve as the information 128. The internal controller 118 can receive such write requests, extract the sequence numbers, and generate the mapping 114 based on the sequence numbers. The internal controller 118 can then store the mapping 114 in an internal cache memory or RAM of the storage device 116. This may reduce the amount of information that is transmitted from the processor 104 to the storage device 116 to implement the garbage collection process 124.

Using any of the above approaches (or other approaches), the internal controller 118 can obtain at least some of the mapping 114 and use it to determine the latest sequence-number for each data block. The internal controller 118 can then determine which data blocks are to be released during the garbage collection process 124 based on the latest sequence-number for each data block. For example, the internal controller 118 can analyze a group of data blocks associated with the log-structured file system 106 to determine which of the data blocks are stale. For example, the internal controller 118 determine a latest sequence-number corresponding to each respective data block in the group of data blocks based on the mapping 114. The internal controller 118 can then identify stale data blocks that do not correspond to the latest sequence-numbers. The internal controller 118 may free the stale data blocks, for example by marking the stale data blocks as free in a FTL 140.

In some examples, the processor 104 can transmit other types of information 128, additionally or alternatively to the mapping 114, usable by the storage device 116 to inform the garbage collection process 124. For example, the information 128 can include the metadata 110 of the log-structured file system 106. The metadata 110 may include, for example, segment summaries describing data segments of the log-structured file system 106. The processor 104 can transmit the metadata 110 to the internal controller 118, which can execute the garbage collection process 124 based on the metadata 110. For example, the processor 104 can determine how inodes and data blocks are arranged in the log-structured file system 106 based on the metadata 110. The processor 104 can then execute the garbage collection process based on how the inodes and data blocks are arranged in the log-structured file system 106.

Data of the log-structured file system 106 can be stored in data blocks 122 of the storage device 116. These data blocks 122 can be flagged by the storage device 116 as being owned by the processor 104. For example, the data blocks 122 can be allocated to the processor 104 in the FTL 140. This may prevent the storage device 116 from freeing the data blocks 122 during its own, internal, default garbage collection process 126. More specifically, the internal controller 118 may automatically execute a default garbage collection process 126. The default garbage collection process 126 is distinct from the garbage collection process 124 associated with the log-structured file system 106, and the default garbage collection process 126 does not rely on the information 128 from the processor 104 to be executed. The default garbage collection process 126 can be for managing data blocks 130 of the storage device 116. In particular, the default garbage collection process 126 can free up stale data blocks that are part of an internal, default log-structured file system 138 of the storage device 116. The default log-structured file system 138 is distinct from the log-structured file system 106 hosted by the processor 104. Allocating the data blocks 122 to the processor 104 can signal to the storage device 116 that the data blocks 122 are not to be freed during the default garbage collection process 126. This can prevent the internal controller 118 from mistakenly freeing data blocks 122 that are still in use by the processor-owned log-structured file system 106.

Although FIG. 1 depicts a certain number and arrangement of components, this is for illustrative purposes and intended to be non-limiting. Other examples may include more components, fewer components, different components, or a different arrangement of the components than is shown in FIG. 1. For instance, the mapping 114 may be generated by and stored in the storage device 116 as described above. So, the memory 134 may exclude the mapping 114 in some such examples. Additionally or alternatively, the storage device 116 can be in communication with the computing device 102 over a network, such as a local area network (LAN) or the Internet. For instance, the system 100 can be a distributed storage system like Ceph. In the context of a distributed storage system, the storage device 116 may be communicatively coupled to the processor 104 via a LAN.

Figure 2:
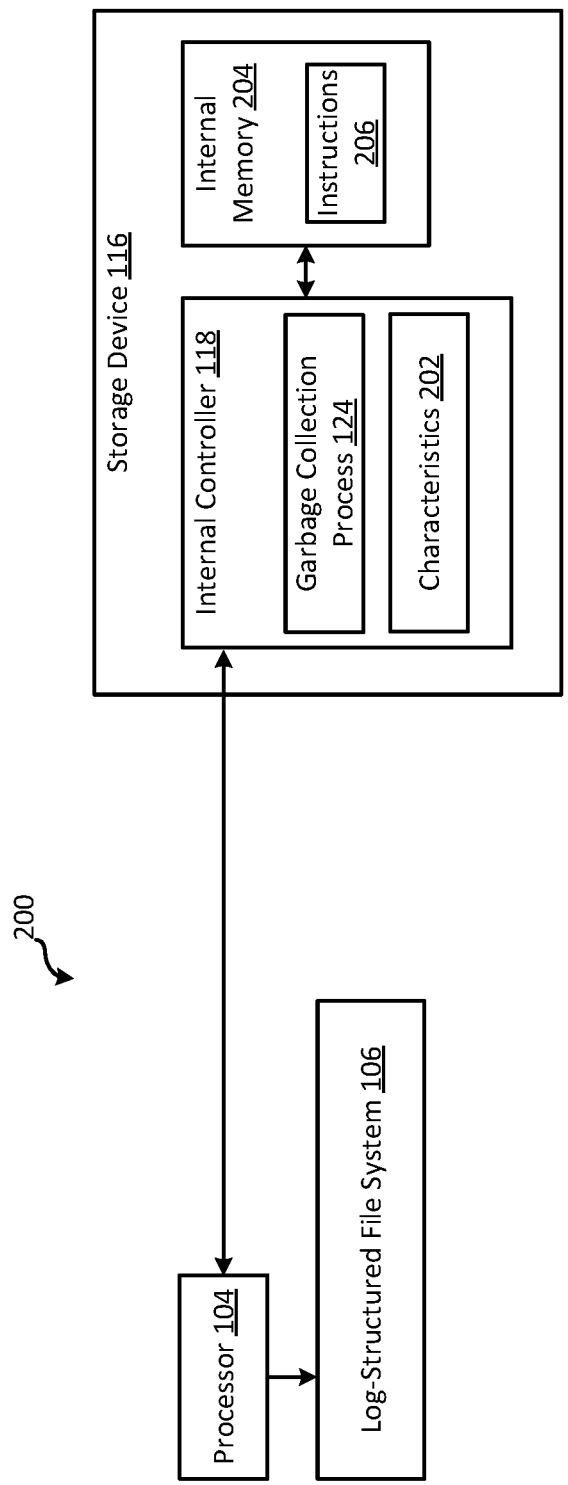
FIG. 2 is a block diagram of another example of a system for offloading garbage collection for a log-structured file system from a processor to an internal controller of a storage device according to some aspects of the present disclosure.

FIG. 2 is a block diagram of another example of a system 200 according to some aspects of the present disclosure. The system 200 includes a processor 104 communicatively coupled to a storage device 116. The processor 104 is external to the storage device 116 and can maintain at least part of log-structured file system 106 externally to the storage device 116.

The storage device 116 includes an internal controller 118 communicatively coupled to an internal memory 204 within a housing of the storage device 116. The internal controller 118 can include one processor or multiple processors. Non-limiting examples of the internal controller 118 can include a Field-Programmable Gate Array (FPGA), an application-specific integrated circuit (ASIC), a microprocessor, etc. The internal controller 118 can execute instructions 206 stored in the internal memory 204 to perform operations. In some examples, the instructions 206 can include processor-specific instructions generated by a compiler or an interpreter from code written in any suitable computer-programming language, such as C, C++, C#, etc.

The internal memory 204 can include one memory or multiple memories. Although the internal memory 204 is depicted as separate from the internal controller 118 in FIG. 2, in other examples the internal memory 204 can be part of the internal controller 118. The internal memory 204 can include a volatile memory such as a cache memory or DRAM, a non-volatile memory such as electrically erasable and programmable read-only memory (EEPROM) or flash memory, or both. At least some of the internal memory 204 includes a non-transitory computer-readable medium from which the internal controller 118 can read the instructions 206. A computer-readable medium can include electronic, optical, magnetic, or other storage devices capable of providing the internal controller 118 with computer-readable instructions or other program code. Examples of a computer-readable medium include magnetic disk(s), memory chip(s), ROM, random-access memory (RAM), an ASIC, a configured processor, optical storage, or any other medium from which a computer processor can read the instructions 206.

In some examples, the internal controller 118 can execute the instructions 206 to perform one or more operations. For example, the internal controller 118 can determine characteristics 202 of a log-structured file system 106 hosted by a processor 104 that is external to the storage device 116. The characteristics 202 can indicate how data is arranged in the log-structured file system 106. The internal controller 118 can then execute a garbage collection process 124 based on the characteristics 202. The internal controller 118 can execute the garbage collection process 124 with respect to the data of the log-structured file system 106 on behalf of the processor 104.

Figure 3:
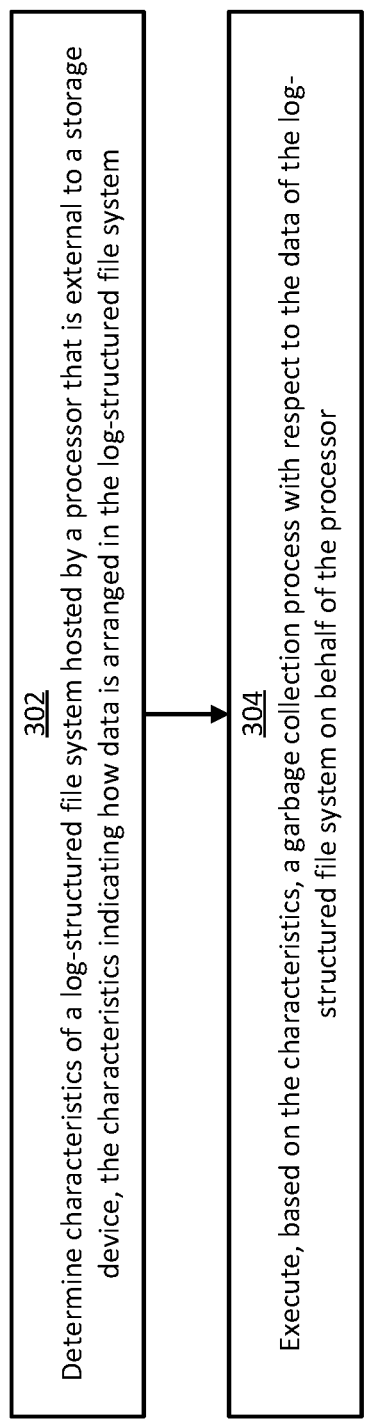
FIG. 3 is a flow chart of an example of a process for offloading garbage collection for a log-structured file system from a processor to an internal controller of a storage device according to some aspects of the present disclosure.

FIG. 3 is a flow chart of an example of a process for offloading garbage collection for a log-structured file system 106 from a processor 104 to an internal controller 118 of a storage device 116 according to some aspects of the present disclosure. Other examples can include more steps, fewer steps, different steps, or a different order of the steps than is shown in FIG. 3. The steps of FIG. 3 are discussed below with reference to the components discussed above in relation to FIG. 2.

In block 302, an internal controller 118 of a storage device 116 determines characteristics 202 of a log-structured file system 106 hosted by a processor 104 that is external to the storage device 116. The characteristics 202 can indicate how data is arranged in the log-structured file system 106.

In block 304, the internal controller 118 executes a garbage collection process 124 based on the characteristics 202. The internal controller 118 can execute the garbage collection process 124 with respect to the data of the log-structured file system 106 on behalf of the processor 104.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A storage device comprising:
an internal controller; and
an internal memory including instructions that are executable by the internal controller for causing the internal controller to:
receive information from a processor that is external the storage device, the information indicating characteristics of a log-structured file system hosted by the processor, the characteristics indicating how data is arranged in the log-structured file system;
determine the characteristics based on the information; and
execute, based on the characteristics, a garbage collection process with respect to the data of the log-structured file system on behalf of the processor, wherein the garbage collection process involves:
determining a plurality of data blocks associated with the log-structured file system; and
for each respective data block among the plurality of data blocks:
determining a latest sequence-number associated with the respective data block based on the information received from the processor;
determining if the respective data block is stale based on the latest sequence-number corresponding to the respective data block; and
freeing the respective data block in response to determining that the respective data block is stale, wherein freeing the respective data block involves marking the respective data block as free; or
maintaining the respective data block in response to determining that the respective data block is not stale.

2. The storage device of claim 1, wherein the information includes a metadata layout describing a format of metadata in the log-structured file system.

3. The storage device of claim 1, wherein the information includes a mapping of the plurality of data blocks to corresponding sequence numbers, and wherein the internal memory further includes instructions that are executable by the internal controller for causing the internal controller to determine the latest sequence-number corresponding to the respective data block based on the mapping.

4. The storage device of claim 1, wherein the information indicates a memory location at which the latest sequence-number for the respective data block is stored, and wherein the internal memory further includes instructions that are executable by the internal controller for causing the internal controller to retrieve the latest sequence-number for the respective data block from the memory location.

5. The storage device of claim 1, wherein the internal memory further includes instructions that are executable by the internal controller for causing the internal controller to:
receive write requests including the information from the processor;
generate a mapping based on the write requests received from the processor, the mapping correlating the plurality of data blocks to corresponding sequence numbers; and
determine the latest sequence-number for the respective data block based on the mapping.

6. The storage device of claim 1, wherein the log-structured file system is different from a default log-structured file system maintained internally to the storage device for managing a set of data blocks within the storage device.

7. The storage device of claim 1, wherein the garbage collection process is different from a default garbage collection process of the storage device, and wherein the internal memory further includes instructions that are executable by the internal controller for causing the internal controller to execute the default garbage collection process independently of the characteristics of the log-structured file system to internally manage a set of data blocks in the storage device.

8. The storage device of claim 1, wherein the storage device is a solid-state drive and the processor is a central processing unit of a computing device.

9. The storage device of claim 1, wherein the storage device is coupled to a computing device that includes the processor and a memory, the memory including program code that is executable by the processor for causing the processor to:
maintain the log-structured file system; and
transmit the information indicating the characteristics to the internal controller of the storage device for enabling the storage device to execute the garbage collection process.

10. The storage device of claim 1, wherein the storage device is configured to free the respective data block by marking the respective data block as free in a flash translation layer of the storage device.

11. A method comprising:
receiving, by an internal controller of a storage device, information from a processor that is external to the storage device, the information indicating characteristics of a log-structured file system hosted by the processor, the characteristics indicating how data is arranged in the log-structured file system;
determining, by the internal controller, the characteristics based on the information; and
executing, by the internal controller and based on the characteristics, a garbage collection process with respect to the data of the log-structured file system on behalf of the processor, wherein the garbage collection process involves:
determining a plurality of data blocks associated with the log-structured file system; and
for each respective data block among the plurality of data blocks:
determining a latest sequence-number associated with the respective data block based on the information received from the processor;
determining if the respective data block is stale based on the latest sequence-number corresponding to the respective data block; and
freeing the respective data block in response to determining that the respective data block is stale, wherein freeing the respective data block involves marking the respective data block as free; or
maintaining the respective data block in response to determining that the respective data block is not stale.

12. The method of claim 11, wherein the information includes a metadata layout describing a format of metadata in the log-structured file system.

13. The method of claim 11, wherein the information includes a mapping of the plurality of data blocks to corresponding sequence numbers, and further comprising determining the latest sequence-number corresponding to the respective data block based on the mapping.

14. The method of claim 11, wherein the information indicates a memory location at which the latest sequence-number for the respective data block is stored, and further comprising retrieving the latest sequence-number for the respective data block from the memory location.

15. The method of claim 11, further comprising:
receiving, by the internal controller, write requests including the information from the processor;
generating, by the internal controller, a mapping based on the write requests received from the processor, the mapping correlating the plurality of data blocks to corresponding sequence numbers; and
determining, by the internal controller, the latest sequence-number for the respective data block based on the mapping.

16. The method of claim 11, wherein the log-structured file system is different from a default log-structured file system maintained internally to the storage device for managing a set of data blocks within the storage device, and wherein the garbage collection process is different from a default garbage collection process of the storage device, and further comprising:
executing, by the internal controller, the default garbage collection process independently of the characteristics of the log-structured file system to internally manage the set of data blocks in the storage device.

17. The method of claim 11, wherein freeing the respective data block comprises marking the respective data block as free in a flash translation layer of the storage device.

18. A non-transitory computer-readable medium comprising instructions that are executable by an internal controller of a storage device for causing the internal controller to:
receive information from a processor that is external the storage device, the information indicating characteristics of a log-structured file system hosted by the processor, the characteristics indicating how data is arranged in the log-structured file system;
determine the characteristics based on the information; and
execute, based on the characteristics, a garbage collection process with respect to the data of the log-structured file system on behalf of the processor, wherein the garbage collection process involves:
determining a plurality of data blocks associated with the log-structured file system; and
for each respective data block among the plurality of data blocks:
determining a latest sequence-number associated with the respective data block based on the information received from the processor;
determining if the respective data block is stale based on the latest sequence-number corresponding to the respective data block; and
freeing the respective data block in response to determining that the respective data block is stale, wherein freeing the respective data block involves marking the respective data block as free; or
maintaining the respective data block in response to determining that the respective data block is not stale.

19. The non-transitory computer-readable medium of claim 18, wherein the information includes a metadata layout describing a format of metadata in the log-structured file system.

20. The non-transitory computer-readable medium of claim 18, wherein the log-structured file system is different from a default log-structured file system maintained internally to the storage device for managing a set of data blocks within the storage device.

* * * * *